United States Patent [19]

Fenton et al.

[11] Patent Number: 4,557,744
[45] Date of Patent: Dec. 10, 1985

[54] MOULD ARRANGEMENT FOR A GLASSWARE FORMING MACHINE

[75] Inventors: Frank A. Fenton, Wheatley; Brian Booth, Sheffield; Stanley P. Jones, Tickhill; Derek Gennard, Maltby, all of England

[73] Assignee: Emhart Industries, Inc., Farmington, Conn.

[21] Appl. No.: 597,989

[22] Filed: Apr. 9, 1984

Related U.S. Application Data

[63] Continuation of Ser. No. 433,133, filed as PCT GB82/00047, Feb. 22, 1982, published as WO82/02881, Sep. 2, 1982, § 102(e) date Sep. 30, 1982, abandoned.

[30] Foreign Application Priority Data

Feb. 27, 1981 [GB] United Kingdom ............... 8106257
Feb. 27, 1981 [GB] United Kingdom ............... 8106259

[51] Int. Cl.⁴ ........................................... C03B 9/38
[52] U.S. Cl. ...................................... 65/29; 65/158; 65/161; 65/162; 65/265; 65/267
[58] Field of Search ............... 65/158, 161, 159, 162, 65/265, 267, 319, DIG. 13, 29

[56] References Cited

U.S. PATENT DOCUMENTS

| | | | |
|---|---|---|---|
| Re. 29,188 | 4/1977 | Croughwell | 65/DIG. 13 |
| 3,525,090 | 8/1970 | Raddatz | 65/158 |
| 3,666,433 | 5/1972 | Nebelung et al. | 65/158 |
| 3,810,747 | 5/1974 | Bork | 65/158 |
| 4,056,949 | 11/1977 | Hahn | 62/373 |
| 4,137,061 | 1/1979 | Mallory et al. | 65/232 |

FOREIGN PATENT DOCUMENTS 1491859 11/1973 United Kingdom .

*Primary Examiner*—Arthur Kellogg
*Attorney, Agent, or Firm*—Arthur B. Moore

[57] ABSTRACT

In the mould arrangement, an electrical temperature sensing device (TC1, TC2, TC3) is mounted on a mould portion (30; 70) and sends signals to control means of the arrangement. The control means is operable to read the signal from the sensing device (TC1, TC2, TC3) at a particular point in the cycle of operation of the machine, selected to occur when the mould portion (30; 70) is stationary, and to control a portion of the operation of the machine, e.g. the operation of the mould cooling means thereof, in accordance with a value of the signal.

10 Claims, 3 Drawing Figures

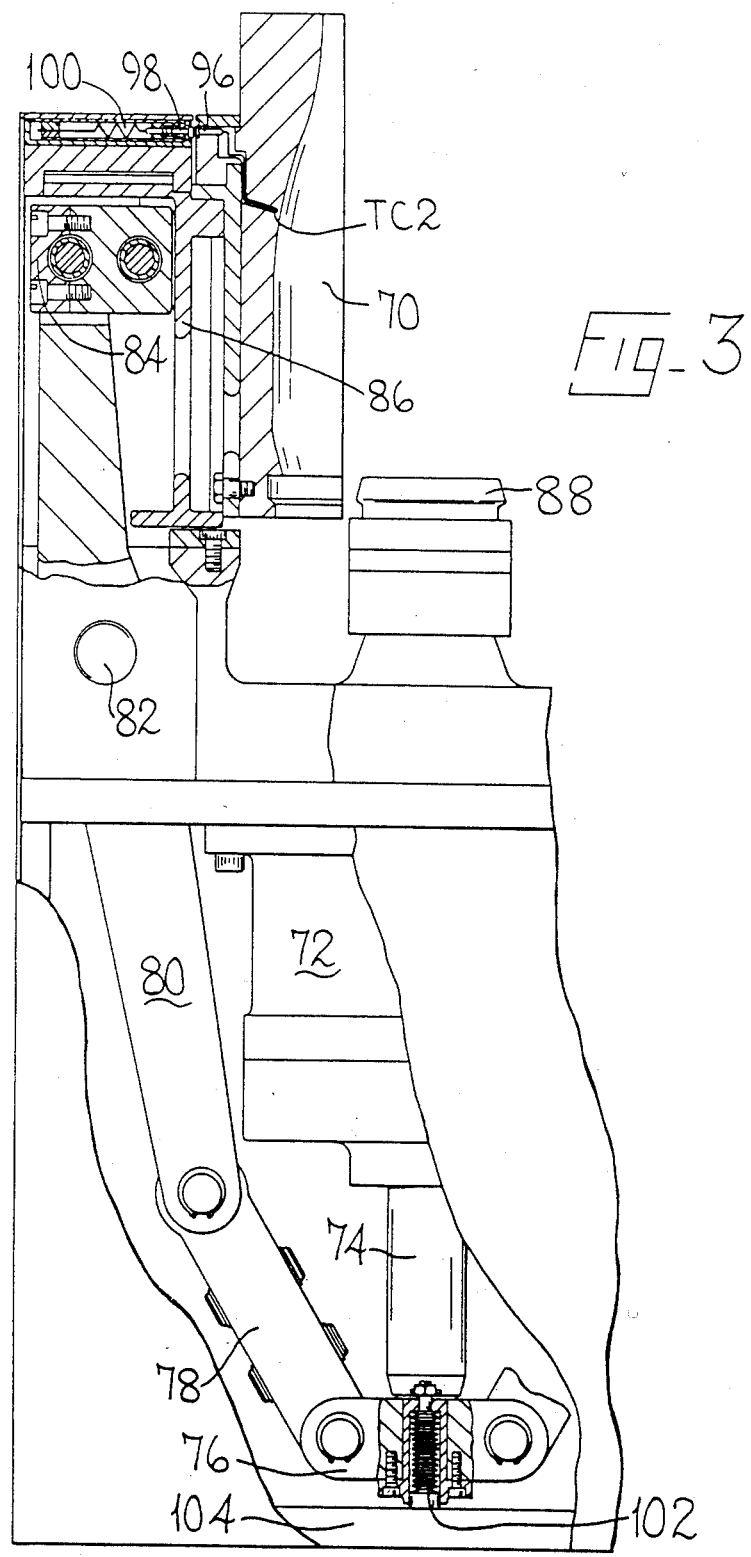

MOULD ARRANGEMENT FOR A GLASSWARE FORMING MACHINE

This application is a continuation of application Ser. No. 433,133, filed PCT GB82/00047, Feb. 22, 1982, published as WO82/02881, Sept. 2, 1982, § 102(e) date Sept. 30, 1982, now abandoned.

TECHNICAL FIELD

This invention is concerned with a mould arrangement for a cyclicly-operating glassware forming machine comprising two mould portion holders each arranged to support a mould portion, the mould portion holders being movable relative to one another to bring the mould portions supported thereby into engagement to form a mould or to separate the mould portions, an electrical temperature sensing device mounted on one of the mould portions, and electrical contact members connecting the electrical temperature sensing device to control means operable to read the signal generated by the temperature sensing device and to control a portion of the operation of the machine in accordance with the value of the signal.

BACKGROUND ART

In glassware forming machines, moulds are used both for shaping the finished article and for preliminary shaping of the glass to form parisons which are then transferred to further moulds. All these moulds need to be maintained in a particular temperature range to ensure correct operation of the machine since, if the moulds become too hot, the glass will stick to them whereas, if the moulds become too cold, the glass will not be correctly shaped. To enable the temperature of the moulds to be controlled, glassware forming machines comprise mould cooling means operable to blow cooling air over the moulds. The cooling means must be controlled so that it cools the moulds sufficiently but not excessively. At present, the cooling means is controlled by an operator by a trial-and-error method so that incorrectly made articles are produced until the operator finds the correct setting for the cooling means.

It is an object of the present invention to provide a mould arrangement in which an electrical temperature sensing device mounted on a mould portion is used to generate a signal which automatically causes a portion of the operation of the machine, e.g. the operation of the cooling means, to be controlled in accordance with the value of the signal.

The use of electrical temperature sensing devices in mould portions presents certain problems. The electrical connections to the device need to be protected from excessive heat and it is desirable if the connections are readily disconnectable so that mould portions can be changed. If flexible wires are used for forming the electrical connection, there is considerable danger that they will be exposed to excessive heat and they may be difficult to disconnect rapidly. On the other hand, if the electrical connections are made through the mechanical mechanism for opening and closing the moulds, the mechanical movements cause considerable electrical noise in the circuit due to the movements of the mould portion and the holders.

DISCLOSURE OF INVENTION

According to the invention, there is provided a mould arrangement in which the control means is arranged to read the signal at a particular point in each cycle of operation of the machine, the particular point being arranged to occur when the mould portion and the mould portion holder are stationary.

In such a mould arrangement, the electrical connections can be protected from excessive heat by being fed through the mould portion holder while the electrical noise generated does not effect the accuracy of the signals read by the control means. In order to increase the accuracy of the control, a further electrical temperature sensing device is mounted on the other mould portion and is connected to control means by further electrical contact members, the control means being operable to read the signals generated by both temperature sensing devices at the particular point in each cycle of operation of the machine and to control the portion of the operation of the machine in accordance with the average of the two signals.

In order to detect whether the electrical temperature sensing device is functioning correctly, the mould arrangement control means may be arranged to compare each signal it receives with a predetermined minimum value and, in the event of the signal not exceeding the minimum value, to generate an error signal.

Where the mould portion holders are each arranged to support a plurality of mould portions, the mould portion holders being movable relative to one another to bring the mould portions supported thereby into engagement to form a plurality of moulds, an electrical temperature sensing device may be mounted on each of the mould portions supported by one of the mould portion holders and be connected to the control means by electrical contact members, the control means being operable to read the signal generated by any of the sensing devices and to control the portion of the operation of the machine in accordance with that signal. In that case, the control means may be operable in the event that the signal received does not exceed a predetermined minimum value to change from which of the sensing devices it reads the signal. This arrangement enables operation of the machine to continue should an electrical temperature sensing device fail.

The electrical contact members may comprise two electrical contact members mounted on the mould portion on which the sensing device is mounted, and two fixedly mounted electrical contact members connected to the control means arranged to make electrical contact with the said two electrical contact members when the mould portion holders are in a mould-open position thereof, the control means being arranged to read the signal when the mould portion holders are in that position.

BRIEF DESCRIPTION OF DRAWINGS

In the accompanying drawings:

FIG. 3 is a longitudinal sectional view of a portion of a second mould arrangement in accordance with the invention.

BEST MODE OF CARRYING OUT THE INVENTION

Figure 1:
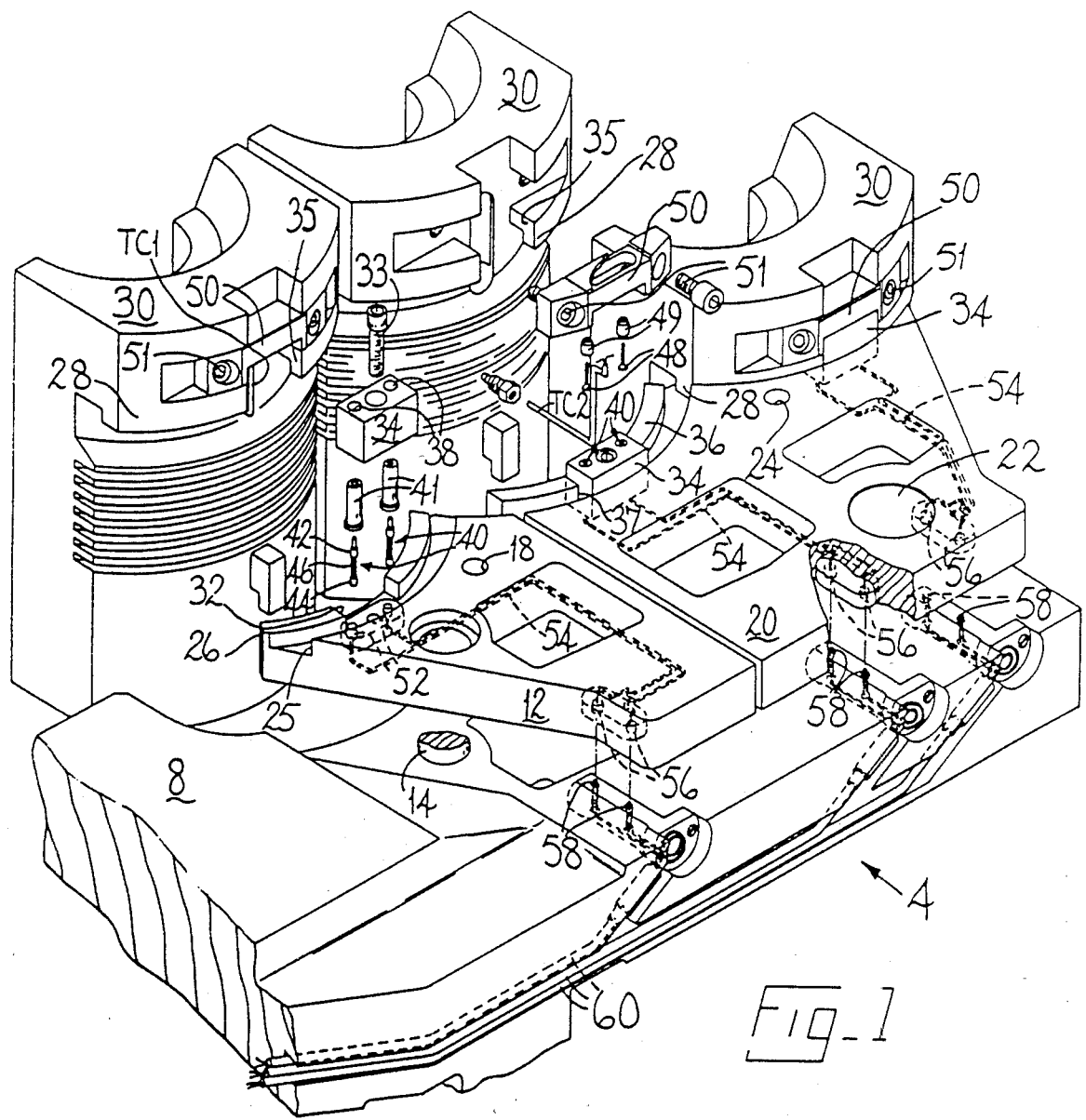
FIG. 1 is an exploded perspective view of a mould portion holder of a mould arrangement according to the invention.

The mould arrangements shown in the drawings are for use in a cyclicly-operating glassware forming machine; in particular the arrangement of FIG. 1 may be located at a parison moulding station of an individual section glassware forming machine and the arrangement shown in FIG. 3 may be located at a further station of such a machine. The arrangement shown in FIG. 1 comprises two mould portion holders which are of similar construction and therefore only one of the mould portion holders 4 is shown in FIG. 1 and will be described in detail.

The mould portion holder 4 comprises a support arm 8 which is mounted for movement towards or away from the other mould portion holder (not shown). A mould portion supporting plate 12 is mounted on top of the arm 8 on a pivot pin 14 which projects upwardly from the arm 8, the pivoting movement of the plate 12 about the pin 14 being limited by a pin (not shown) which projects upwardly from the arm into a hole 18 in the plate 12. Mounted on top of the arm 8 beside the supporting plate 12 is a second supporting plate 20 which is mounted on a pivot pin 22 with its pivoting movement being limited by a pin which projects into a hole 24 in the plate 20. The plate 12 has a curved edge surface adjacent to which a curved groove 25 is formed in the plate 12 so that a curved upward projection 26 is left extending along one edge of the plate 12. To mount a mould portion 30 on the plate 12, a curved hooked portion 28 of the mould portion 30 is fitted over the projection 26 so that the mould portion 30 hangs on the projection 26. At a central portion thereof, the projection 26 has a gap 32 therein in which a locating block 34 is mounted. The locating block 34 is secured to the plate 12 by means of a screw 33 and is received in a gap 35 in the curved hook portion 28 so that the mould portion 30 is accurately located on the plate 12 thereby. The plate 20 is provided with two projections 36 (only one visible in FIG. 1) which are similar to the projection 26 and have gaps 37 therein in which two further locating blocks 34 are mounted. Curved hook portions 28 of two further mould portions 30 can be fitted over the projections 36. The holder 4 can thus support a plurality, viz. three of mould portions 30, one on the plate 12 and two on the plate 20. This arrangement is to assist in obtaining equal closing pressure when the mould portions 30 are moved together to create closed moulds.

The mould portion holders are movable relative to one another to bring the mould portions 30 supported thereby into engagement so that each pair of mould portions 30, one supported by each holder, forms a mould in which glass can be shaped in the operation of the machine, or to separate the mould portions 30 for removal of glass from the mould. This relative movement is achieved by moving means (not shown) which move both holders toward or away from one another.

Each locating block 34, on each of the holders, has two vertical bores 38 therethrough in which two electrical contact members 40 are mounted within sleeves 41. The contact members 40 each comprise an upper contact portion 42 and a lower contact portion 44 which are spring urged apart by a spring 46. Each pair of contact members 40 is arranged to make electrical contact, when a mould portion 30 is mounted on the plate 12 or 20, with two further electrical contact members 48 mounted in sleeves 49 in a block 50 secured to the mould portion 30 above the gap 35 by screws 51. The electrical contact members 48 are connected to an electrical temperature sensing device in the form of a thermocouple mounted on the mould portion 30. The three thermocouples mounted on the three mould portions 30 supported by the holder 4 are designated TC1, TC2 and TC3 (TC3 not visible in FIG. 1). When a mould portion 30 is mounted on the holder 4, the upper contact portions 42 of the contact members 40 make electrical contact with the contact members 48, the contact being maintained by the action of the spring 46. In the operation of the machine, slight movements occur between the mould portions 30 and the plate 12 and 20, these movements cause a self cleaning effect between the contact members 40 and 48.

Figure 2:
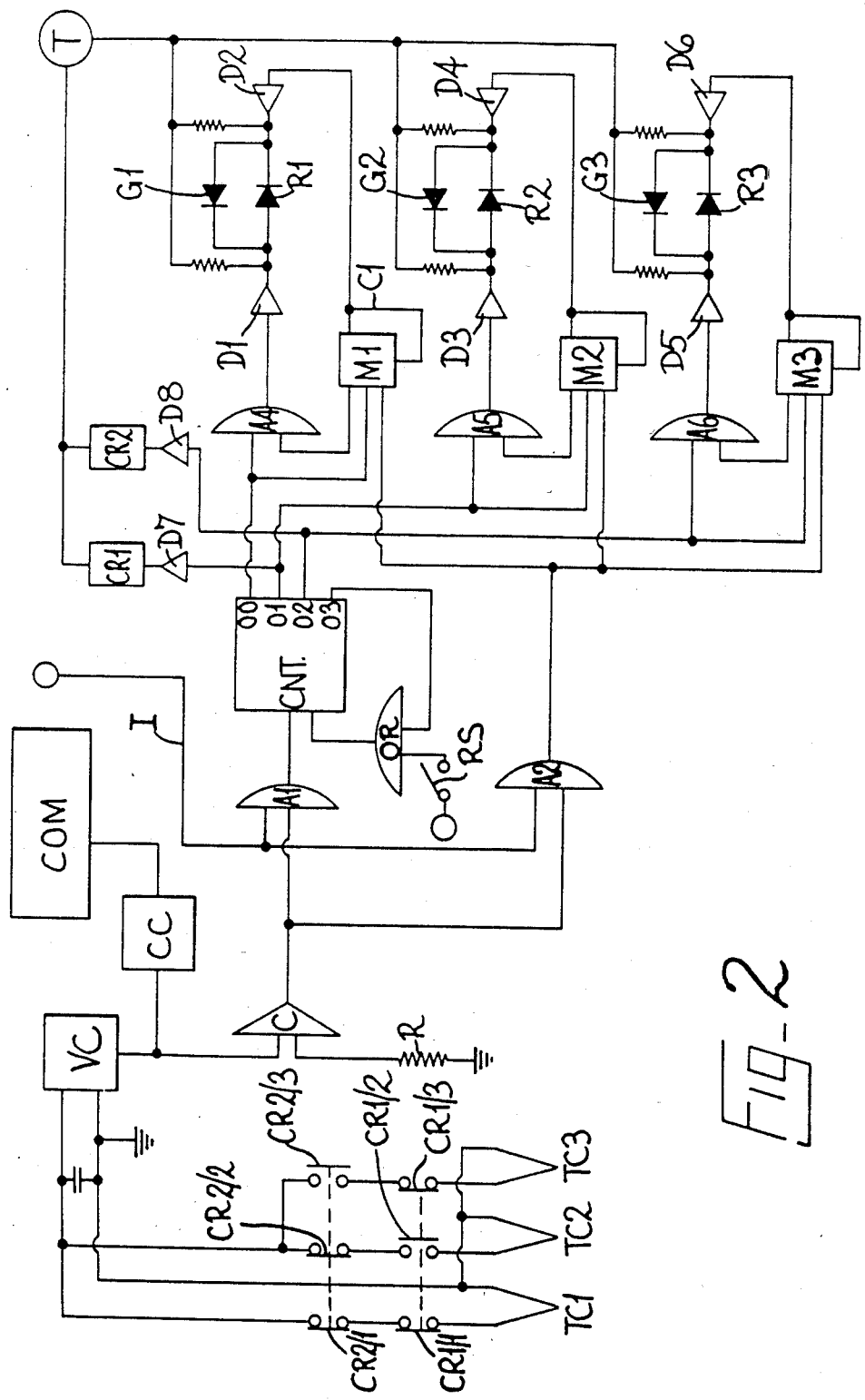
FIG. 2 is a diagrammatic view of the control means of the mould arrangement of FIG. 1.

The lower contact portions 44 of the contact members 40 engage contacts 52 embedded in the plate 12 or 20 and connected by wires 54 to further contacts 56 embedded in the underside of the plate 12 or 20. The wires 54 pass through the plate 12 or 20 and are thus protected from excessive heat. The contacts 56 are arranged to make electrical contact with spring-loaded contacts 58 mounted on the support arm 8. Thus, the support arm 8 and the supporting plate 12 or 20 are electrically connected to pass the signal generated by the thermocouple to wires 60 which lead to the control means shown in FIG. 2. The control means shown in FIG. 2 is duplicated for each of the holders except that there is a common computer COM which controls the operation of the machine. The computer COM controls among other things the motion of the holders towards and away from one another.

The control means is operable to read the signal generated by the thermocouple mounted on a mould portion 30 and passed through the contact members 40 and 48 and the contacts 52, 56 and 58 and to control a portion of the operation of the machine in accordance with the value of the signal. In particular the control means is operable to control the operation cooling means (not shown) arranged to cool the mould portions 30 in accordance with the value of the signal generated by the thermocouple. The control means controls the operation of the cooling means by controlling the duration of the operation of the cooling means in each cycle of operation of the machine.

The control means comprises two relays CR1 and CR2 each of which operates three sets of relay contacts, CR1/1, CR1/2 and CR1/3 being operated by the relay CR1 and CR2/1, CR2/2 and CR2/3 being operated by the relay CR2. The two sets of contacts are connected between the thermocouples TC1, TC2 and TC3 and a voltage converter VC which also provides cold junction compensation for the thermocouples. The relay contacts are so arranged that, the thermocouple TC1 is connected to the voltage converter VC, if the relay CR1 is then energised, the thermocouple TC2 is connected to the voltage converter VC while the thermocouple TC1 is disconnected therefrom, and, if the relay CR2 only is energised, the thermocouple TC3 is connected to the voltage converter VC while the thermocouples TC1 and TC2 are disconnected therefrom. Thus, only one of the thermocouples TC1, TC2 and TC3 is connected to the voltage converter VC at any one time but energisation of one or other of the relays CR1 and CR2 alters which thermocouple is so connected.

The voltage converter VC amplifies the voltage it receives from the thermocouple and passes its output to a current converter CC and to a comparator C. The current converter CC passes a current proportional to the voltage it receives, and thence proportional to the temperature indicated by the thermocouple, to the computer COM. The computer COM is arranged to read the signal it receives at a particular point in each cycle of operation of the machine. The particular point is arranged to occur, when the mould portion 30 and the mould portion holder are stationary, i.e. when the mould is either fully closed or fully open; this is done to eliminate electrical noise created by the movement of the holder and/or the mould portion 30. The computer COM receives signals from one of the thermocouples of each holder at the particular point in each cycle of operation and controls the aforementioned cooling means in accordance with the average of those signals. At the aforementioned particular point, an electrical signal is sent along a line I to two AND GATES A1 and A2 of the control means; this electrical signal may be generated by the computer COM or generated elsewhere in the machine.

The comparator C of the control means acts to compare the signal it receives from the voltage converter VC with a predetermined minimum value determined by a resistor R connected between the comparator C and earth. If the signal exceeds the predetermined minimum value, indicating that the thermocouple is producing an acceptable signal, the comparator C produces no output but, in the event of the signal not reaching the minimum value, indicating a malfunction of the thermocouple or a break in the electrical connections thereto, the comparator acts to send an electrical pulse to the AND GATES A1 and A2.

When the AND GATE A1 receives simultaneously a signal from the line I and a signal from the comparator C, indicating that the thermocouple is not producing an acceptable signal at the particular point in the cycle of operation of the machine, it sends an electrical signal to a counter CNT thereby generating an error signal which will cause the control means to change the thermocouple TC1, TC2 or TC3 whose signal it reads. The active signal at any one time being sometimes referred to hereinafter as the "controlling" signal. Meanwhile the AND GATE A2, having also received a signal from both the line I and the comparator C sends a signal to each of three memories M1, M2 and M3, one of which memory is associated with each thermocouple. These memories M1, M2 and M3 are operable to cause an optical error signal to be generated, the optical error signal being generated continuously until the memory is re-set.

The counter CNT is provided with four outputs and is arranged to produce a signal on one of those outputs at a time in accordance with how many signals it has received from the AND GATE A1. If the counter CNT has received no pulses, it produces a signal on an output 00 thereof which is passed to an AND GATE A4 and to the memory M1. While the memory M1 is receiving this signal, it sends an output to the AND GATE A4 which then sends a signal to a driver D1 which thereupon allows current to pass from a terminal T through a light emitting diode G1 arranged to emit green light to indicate that the thermocouple TC1 is functioning correctly. If, however, the comparator C detects an inadequate signal, the AND GATE A2 passes a pulse to the memory M1 causing it to remove its output from the AND GATE A4 and send its output instead to a driver D2 which thereupon allows current to pass from the terminal T through a light emitting diode R1 arranged to emit red light which forms an optical error signal. The comparator C also causes a signal from the AND GATE A1 to reach the counter CNT which then transfers its output to an output 01 thereof. The driver D2 will continue to cause the diode R1 to emit the error signal until the memory M1 is re-set since the signal to the driver D2 is locked on by a connection C1 to the memory M1.

The output 01 is connected to an AND GATE A5 and to the memory M2 which functions in the same manner as the memory M1 in relation to the AND GATE A5, two drivers D3 and D4, and two light emitting diodes G2 and R2. In addition, however, the output 01 is connected to a driver D7 which allows current to flow from the terminal T through the relay CR1 and thus to switch the contacts CR1/1, CR1/2 and CR1/3 thereby disconnecting the thermocouple TC1 from the voltage converter VC and connecting the thermocouple TC2 to the voltage converter VC. If the comparator C detects an inadequate signal, the counter CNT transfers its output to an output 02 thereof which is connected to the memory M3, an AND GATE A6, and a driver D8 which acts to cause current to flow through the relay CR2; this disconnects the thermocouple TC2 but connects the thermocouple TC3 to the voltage converter VC. The memory M3 acts in the same way as the memories M1 and M2 but in respect of the AND GATE A6, two drivers D5 and D6 and two light emitting diodes G3 and R3. The drivers D2, D4 and D6 are arranged to continue to operate after once having received a signal from the AND GATES A4, A5 and A6 respectively so that the diodes R1, R2 and R3 will indicate that their associated thermocouples have failed to produce an adequate signal.

When the counter CNT receives its third pulse from the AND GATE A1, it transfers its output to an output 03 thereby de-energising a relay CR2 and causing a thermocouple TC1 to be re-connected to the voltage converter VC. The output 03 is connected to an OR GATE OR (also connected to a re-set switch RS) which re-sets the counter CNT so that its output is transferred to the output 00. The sequence of operation of the counter can then begin again. The mould arrangement shown in FIGS. 1 and 2 provides for automatic control of a portion of the operation of the machine, e.g. the operation of the cooling means thereof, and therefore enables higher production of correctly made articles to be achieved.

FIG. 3 shows a mould arrangement having a control means identical to that shown in FIG. 2 and in which the control means is arranged to read the signal when mould portions 70 of the arrangement are in a fully open position. The mould arrangement comprises a mould opening and closing mechanism comprising a piston and cylinder assembly 72 having a piston rod 74 thereof connected to a crosshead 76. The crosshead 76 is connected by links 78 to levers 80 which are mounted for pivoting movement on pivot pins 82. The levers 80 are also connected to supports 84 on which the mould portions 70 are supported, there being an intermediate support 86 between the support 84 and the mould portion 70. The arrangement is such that, operation of the piston and cylinder assembly 72 is effective to cause the levers 80 to pivot about the pivot pin 82 to move the supports 84 and bring the mould portions 70 (only one such mould portion 70 being shown in FIG. 3) into engagement with one another and with a fixed mould bottom portion 88. Operation of the piston and cylinder assembly 72 in the opposite direction is effective to bring the mould portions 70 to a mould open position (shown in FIG. 3).

When the mould portions 70 are in the mould open position, electrical contact members 96 mounted on the mould portions make electrical contact with electrical contact members 98 mounted on the framework of the machine. The contact members 98 are urged by springs 100 towards the contact members 96. Thus, when the moulds are fully open, there is electrical contact between the members 96 and 98 so that at this point in the cycle of operation of the machine the control means can receive a signal from a thermocouple TC2 mounted on the mould portion 70 and connected to the contact member 96. As in the embodiment shown in FIG. 1, there are three mould portions 70 adjacent to one another having thermocouples TC1, TC2 and TC3 mounted thereon. Thus the electrical contact members of the mould arrangement comprise two electrical contact members 96 mounted on the mould portion 70 on which the thermocouple is mounted, and two fixedly mounted electrical contact members 98 connected to the control means.

The crosshead 76 carries a spring device 102 arranged to press on a plate 104 of the framework of the machine. When the mould portions 70 are in the mould-open positon thereof, the spring device 102 presses on the plate 104 but does not overcome the action of the piston and cylinder assembly 72. However, when the supply of air under pressure to the piston and cylinder assembly 72 is removed, the spring device 102 moves the crosshead 76 away from the plate 104 thereby moving the mould portions 70 towards one another and removing the contact between the contact members 96 and 98. This arrangement enables the mould portion 70 to be removed from the machine without damage to the contacts 96 and 98.

While the preferred embodiment disclosed herein is in part hardwired and the details of the computer COM are not discussed, it will be understood by those skilled in the art that various software embodiments of the invention described herein may be produced. Consequently, it will be understood that all such other embodiments of the invention described herein may be produced. Consequently, it will be understood that all such other embodiments of the invention described herein are intended to be covered by the following claims.

We claim:

1. A mold arrangement for a cyclically-operating glassware forming machine comprising:
   at least two mateable mold portions;
   two mold portion holders, each arranged to support at least one of said mold portions, the mold portion holders being movable relative to one another to bring the mold portions supported thereby into engagement to form a mold or to separate the mold portions;
   a first electrical temperature sensing device mounted on one of the mold portions;
   a pair of first electrical contact members operatively connected to said first electrical temperature sensing device;
   a pair of second electrical contact members operatively secured to said one of said mold portion holders and adapted for mateable engagement with said first electrical contact members when said mold portion is supported by its associated mold portion holder;
   control means for reading a predetermined temperature signal ouput of said first electrical temperature sensing device and for controlling a portion of the operation of said machine in accordance with said predetermined temperature signal output;
   conducting means operatively connecting said second electrical contact members to said control means;
   means for producing a signal at a predetermined point in each cycle of operation of said machine and means for communicating said signal to said control means;
   means responsive to said signal for causing said control means to read said predetermined temperature signal ouput at said predetermined point.

2. A mold arrangement according to claim 1 wherein said mold portions and said mold portion holders are stationary at said predetermined point in each cycle of operation of said machine.

3. A mold arrangement according to claim 1 further comprising:
   a second electrical temperature sensing device mounted on the other of said mold portions;
   third electrical contact members operatively connected to said second electrical temperature sensing device;
   fourth electrical contact members operatively secured to said other of said mold portions and adapted for mateable engagement with said second electrical contact members when said mold portion is supported by its associated mold portion holder;
   conducting means operatively connecting said fourth electrical contact members to said control means;
   means for causing said control means to determine the average of the outputs of said first and second electrical temperature sensing devices at said predetermined point, said control means for controlling a portion of the operation of said machine in accordance with said average.

4. A mold arrangement according to claim 1 wherein said mold portion holders support a plurality of mold portions sufficient to form more than one mold in operation and wherein each mold has operatively associated therewith an electrical temperature sensing device operatively connected to said control means further comprising:
   means enabling said control means to control a portion of the operation of said machine in accordance with the output signal of a selected one of said temperature sensing devices.

5. A mold arrangement according to claim 4 wherein said control means will, in the event that a signal received from a selected one of said temperature sensing devices does not exceed a predetermined minimum value, change the sensing device from which it reads the controlling signal.

6. A mold arrangement according to claim 5 wherein said control means comprises a memory means associated with each said temperature sensing device, said memory means being operable to generate a continuous error signal in the event that the signal from a selected one of said temperature sensing devices does not exceed said predetermined minimum value.

7. A mold arrangement for a cyclically-operating glassware forming machine comprising:
   at least two mateable mold portions;
   two mold portion holders, each arranged to support at least one of said mold portions, the mold portion holders being movable relative to one another to bring the mold portions supported thereby into engagement to form a mold or to separate the mold portions;

a first electrical temperature sensing device mounted on one of the mold portions;

two first electrical contact members operatively connected to said first electrical temperature sensing device;

two second electrical contact members fixedly secured to said glassware forming machine and adapted for mateable engagement with said two first electrical contact members when said mold portions and associated mold portion holders are in the open position;

control means for reading a predetermined temperature signal output of said first electrical temperature sensing device and for controlling a portion of the operation of said machine in accordance with said predetermined temperature signal output;

conducting means operatively connecting said second electrical contact members to said control means;

means for producing a signal at a predetermined point in each cycle of operation of said machine and means for communicating said signal to said control means;

means responsive to said signal for causing said control means to read said predetermined temperature signal output at said predetermined point.

8. A mold arrangement according to claim 7 characterized in that the arrangement comprises means enabling said first and second electrical contact members to be moved out of contact with one another to allow said mold portions to be removed from said mold holders.

9. In a cyclically operating glassware forming machine comprising two mold portion holders arranged to support at least one mold portion, the mold portion holders being movable relative to one another to bring the mold portion supported thereby into engagement to form a mold or to separate the mold portions, an electrical temperature sensing device mounted on one of said mold portions, electrical contact members connecting said electrical temperature sensing device to control means, said control means being operable to read the signal generated by said temperature sensing device and to control a portion of the operation of said machine in accordance with the value of the read signal, the method comprising the steps of:

selecting a predetermined point in each cycle of operation of said machine;

reading the output of said temperature sensing device at said predetermined point;

controlling at least a portion of the operation of said machine in accordance with said output of said temperature sensing device at said predetermined point.

10. A method according to claim 9 wherein said predetermined point in each cycle of operation of said machine is a point where said mold portion and mold portion holders are stationary.

* * * * *